US012032352B2

(12) United States Patent
Vannuffelen et al.

(10) Patent No.: US 12,032,352 B2
(45) Date of Patent: Jul. 9, 2024

(54) SERVO JOINT SAFETY POSITION MONITORING APPARATUS AND METHOD

(71) Applicant: Mantis Robotics, Inc., Danville, CA (US)

(72) Inventors: Gerry Vannuffelen, Danville, CA (US); Pei Jui Wang, New Taipei (TW)

(73) Assignee: Mantis Robotics, Inc., Danville, CA (US)

( * ) Notice: Subject to any disclaimer, the term of this patent is extended or adjusted under 35 U.S.C. 154(b) by 211 days.

(21) Appl. No.: 17/838,070

(22) Filed: Jun. 10, 2022

(65) Prior Publication Data

US 2022/0397884 A1 Dec. 15, 2022

Related U.S. Application Data

(60) Provisional application No. 63/232,112, filed on Aug. 11, 2021, provisional application No. 63/210,457, filed on Jun. 14, 2021.

(51) Int. Cl.
*G05B 19/4062* (2006.01)

(52) U.S. Cl.
CPC .................... *G05B 19/4062* (2013.01); *G05B 2219/41324* (2013.01)

(58) Field of Classification Search
CPC .................. G05B 19/4062; G05B 2219/41324
See application file for complete search history.

(56) References Cited

U.S. PATENT DOCUMENTS 5,210,476 A 5/1993 Kazato
6,847,914 B2 1/2005 Kostal
8,036,776 B2 10/2011 Hellberg
8,072,173 B2 12/2011 Hamahata
8,659,254 B2 2/2014 Ueno
9,410,828 B2 8/2016 Nagata
9,887,647 B2 2/2018 Luo
10,454,346 B2 10/2019 Ogawa
(Continued)

FOREIGN PATENT DOCUMENTS

DE 102008054501 A1 6/2010
EP 2282402 2/2011
(Continued)

OTHER PUBLICATIONS

Kim, Joohn Sheok et al., New Approach for High Performance PMSM Drives without Rotational Position Sensors, Proceedings of 1995 IEEE Applied Power Electronics Conference and Exposition, pp. 904-911, Mar. 5, 1995, Dallas, TX, United States.

*Primary Examiner* — Zoheb S Imtiaz

(57) ABSTRACT

A safety apparatus and method for monitoring the position of a servo joint in a servo joint driving system are introduced. The safety apparatus includes modules for measuring powerline signals to determine a servo motor position and/or speed safely. By analyzing the synchronization between the motor and powerline signals, loss of synchronization, unexpected resistance experienced by the motor, and other fault conditions are detected so that power can be cut from the servo motor for safety. The safety apparatus and method achieve a functional safety position and/or speed generating and monitoring and reduce reliance on expensive position sensors and encoders. Robots utilizing the safety apparatus and a method of its use are also disclosed.

20 Claims, 9 Drawing Sheets

32 $V_a$ $i_a$ U 1 N S 33 $V_b$ $i_b$ V W 34 $V_c$ $i_c$

(56) References Cited

U.S. PATENT DOCUMENTS

| | | | | |
|---|---|---|---|---|
| 2009/0309531 | A1* | 12/2009 | Hamahata | H02P 6/04 318/565 |
| 2010/0145519 | A1 | 6/2010 | Keyl | |
| 2019/0248006 | A1* | 8/2019 | Takahashi | B25J 13/085 |
| 2019/0372506 | A1 | 12/2019 | Hashimoto | |
| 2020/0103856 | A1* | 4/2020 | Wang | G05B 19/0423 |

FOREIGN PATENT DOCUMENTS

| | | | |
|---|---|---|---|
| JP | 5955447 | B1 | 3/1984 |
| JP | H09130965 | A | 5/1997 |
| JP | 2002350184 | A | 12/2002 |
| JP | 2004181543 | A | 7/2004 |
| JP | 2006136064 | | 5/2006 |
| JP | 2006262569 | | 9/2006 |
| JP | 2008141828 | | 6/2008 |

* cited by examiner

SERVO JOINT SAFETY POSITION MONITORING APPARATUS AND METHOD

This application claims the benefit of U.S. Provisional Patent Application No. 63/210,457, filed Jun. 14, 2021, and U.S. Provisional Patent Application No. 63/232,112, filed Aug. 11, 2021, each of which is hereby incorporated by reference herein in its entirety.

FIELD

This disclosure relates to robotics, and more particularly to robotic safety systems.

BACKGROUND

Robotic systems are often used for industrial purposes. Such robotic systems include industrial robots. Position sensing is often used as a functional safety structure for industrial robots. The position sensing is used to sense the position of one or more components of the robot to ensure that the robot operates safely in its environment. This can be particularly challenging when the robots work in close proximity to humans.

It would be desirable to be able to provide robots with position sensing capabilities that operate in an accurate, reliable, cost-effective manner, and safe manner even in close proximity to humans.

SUMMARY

A safety apparatus and method is provided for monitoring the position of a servo joint in a servo joint driving system of the type having a servo driver, a servo motor (e.g., a permanent-magnet synchronous (PMSM) motor) having at least a rotor, and a plurality of multiphase powerlines electrically connecting the servo driver to the servo motor.

The safety apparatus may include a motor powerline electric signal detecting module that is adapted to measure an electric signal such as a voltage level on each of the multiphase powerlines, a motor powerline electric signal processing module that is adapted to convert the electric signal of each of the multiphase powerlines to a set of digital signal values, a digitized signal diagnosis module adapted to analyze the digital signal values to determine a fault condition of the servo driver, a rotor position converting module adapted to analyze the digital signal values to determine an estimated rotor position, a motor synchronization diagnosis module adapted to analyze the digital signal values to determine a synchronization status of the servo motor to determine the a fault condition of the servo motor, and a power switch module adapted to cut power to the servo motor.

Several embodiments are provided, which include means to construct a dual channel structure based on the disclosed joint position monitoring method, means to extent the safe position monitoring to safe speed monitoring, and means to generate absolute position information.

Furthermore, a robot with position and speed safety functions and without requiring encoders incorporated into the safety-related part of the system is also introduced by utilizing the function safety design in the disclosure.

DETAILED DESCRIPTION

Figure 1:
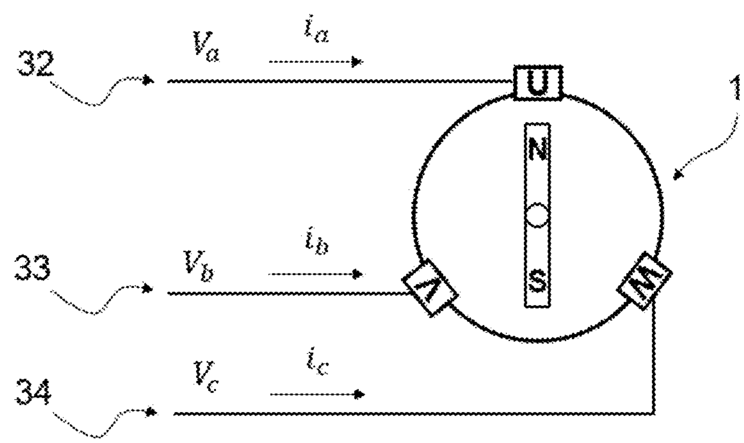
FIG. 1 is a simplified diagram of an illustrative servo motor in accordance with some embodiments.

The following description provides specific details for a thorough understanding of and enabling description for the disclosed embodiments. One of ordinary skill in the art will understand that one or more embodiments may be practiced without one or more of such specific details. In some instances, specific description of well-known structures or functions may have been omitted to avoid unnecessarily obscuring the description of the embodiments.

Unless the context clearly requires otherwise, the words “comprise,” “comprising,” and the like are to be construed in an inclusive sense as opposed to an exclusive or exhaustive sense. The words “herein,” “above,” “below”, when used in this description, refer to this description as a whole and not to any particular portions of this description. When the claims use the word “or” in reference to a list of two or more items, that word covers all of the following interpretations of the word: any of the items in the list, all of the items in the list, and any combination of the items in the list. When the word “each” is used to refer to an element that was previously introduced as being at least one in number, the word “each” does not necessarily imply a plurality of the elements but can also mean a singular element.

Robotic systems are often used in industrial applications. Such robotic systems include one or more machines such as robots, sometimes referred to herein as industrial robots. The robots may include robotic arms, as one example. The robots may perform one or more industrial and/or commercial tasks (e.g., manufacturing tasks, assembly tasks, disassembly tasks, fabrication tasks, sorting tasks, picking tasks, delivery tasks, receiving tasks, etc.). The robots often work in close proximity to humans such as human workers who perform similar, supplementary, or collaborative tasks to those performed by the robots (e.g., in human robot collaboration (HRC)). Humans working in HRC with the robots may be required to touch (contact), guide, teach, and/or otherwise interact with the robots in performing the tasks.

The robots may include two or more components that move and/or rotate with respect to each other about one or more robot joints (sometimes referred to herein simply as joints). If care is not taken, movement of the one or more components of the robots can pose a hazard to nearby humans (e.g., humans working in HRC with the robots), animals, and/or objects. To mitigate these hazards, the robots may include position sensing equipment to sense the position and/or movement of the one or more components and/or the one or more joints. The position sensing equipment may include one or more position sensors. The robots may use components such as an encoder (optical or magnetic) or a resolver (a device working like a rotating transformer) as a position sensor of a robot joint, for example. The position sensors may perform joint position/speed monitoring, position/speed monitoring at specific physical points on the robot (e.g., a tool center point (TCP), elbow, and/or safety motion area of the robot), etc. Such position monitoring (sensing) may be used to ensure that the robot will not exceed a user defined safety boundary, such as the "Safety rated soft axis/space limiting" described in ISO 10218-1: 2011. Speed limiting may be used to reduce risk during teaching and human-robot interaction or collaboration, such as during the "Safety-rated reduced speed control" and "Safety-rated monitored speed" described in ISO 10218-1: 2011. In addition, position sensing may also be used in "Standstill" monitoring as a safety function to make sure the robot is stationary when the robot is stopped but the power to the robot has not been cut.

To meet the safety performance level and structure requirement defined in ISO 10218-1, the robots may need to reach at least PL=d and Cat. 3 structure as defined in ISO 13849-1 or SIL2 and HFT=1 as defined in IEC 61508 for all safety functions. PL=d or SIL2 means that the robots exhibit less than a certain level of probability of dangerous failure or the safety integrity. The Cat. 3 structure or HFT=1 is often referred to as a "Dual Channel Structure", which ensures a single fault in the safety system will not cause the failure of the safety function, and faults of the non-safety related part will not cause the safety function to fail. So, the dual channel design of the position sensing of a robot is often a critical part of the safety design of a robot.

One method of exhibiting a dual channel structure for position safety functions involves the duplication of encoder hardware. This is, however, an excessively expensive solution. Other approaches, like comparing control command and result (e.g., feedback of encoder), may still exhibit other problems when trying to comply with functional safety requirements. For example, the need to make more parts of the system involved in functional safety design, like at least the control parts of the motor driver, can make both the development cost and cost of the robot higher. In addition, most safety improvements to a robot to provide it with the required functional safety require a deep change to the original robot, like changing encoder, motor driver, or related structure inside a robot's controller, which is not convenient and can require expensive disassembly and reassembly of the entire robot. It may therefore be desirable to be able to provide systems and methods for performing the position safety functions of a robot or machine without incorporating the encoder into the safety related part (e.g., to allow the functions to be easily added to the robot after factory installation of the robot).

Figure 2:
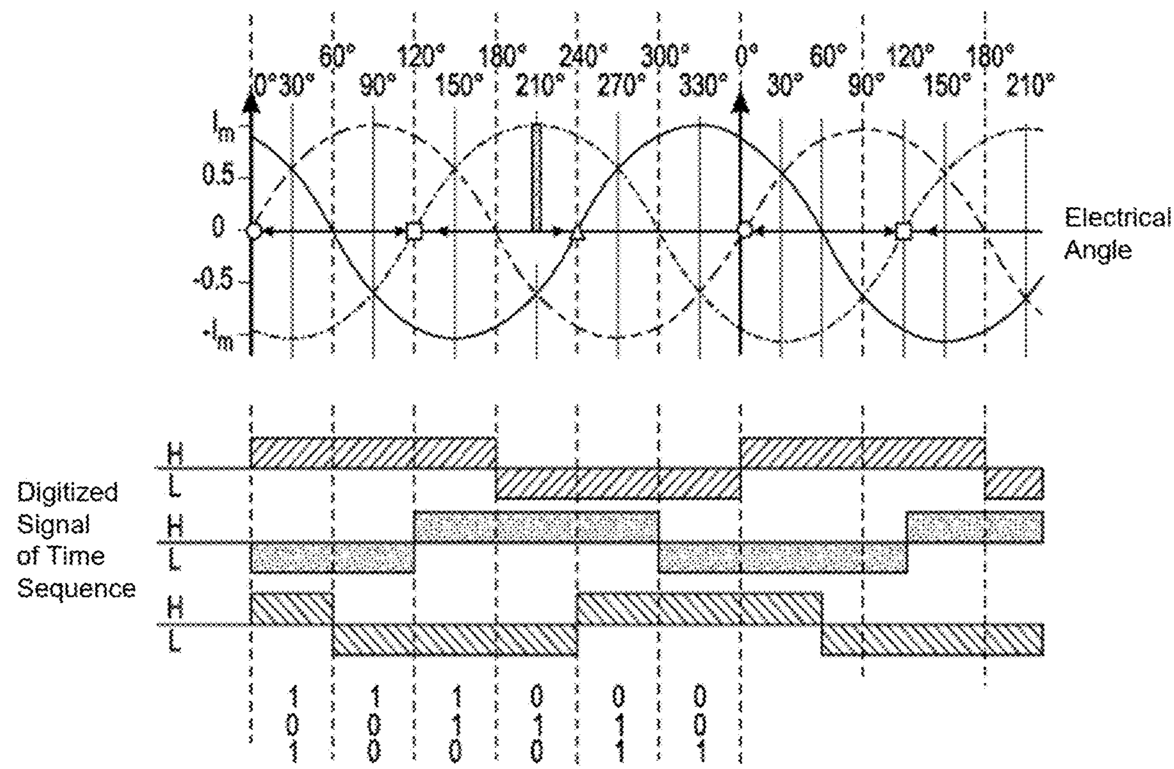
FIG. 2 is a timing diagram of illustrative electric signals on the armature windings of a synchronous motor and their digitization in accordance with some embodiments.

Motion of one or more components that move and/or rotate (e.g., with respect to one or more other components about a mechanical joint) within a robot or machine may be driven by a servo motor in a servo driving system. The servo motor may allow for precise motion of the one or more components using feedback about the servo motors current state to a controller or servo driver. FIG. 1 is a simplified diagram of an illustrative servo motor for a robot such as servo motor 1. Servo motor 1 may be, for example, a permanent-magnet synchronous motor (PMSM). Servo motor 1 may sometimes be referred to herein as motor 1, actuator 1, or PMSM 1. Servo motor 1 is shown as including three stator windings and a pair of magnetic poles in a rotor (e.g., the permanent magnets on the rotor of a PMSM). This is merely illustrative and, in general, there may be more pairs and more stator windings in servo motor 1, such as when servo motor 1 is used in a robot or multi-axes machine, to exhibit more continuous motion performance through the whole circle of rotation. The waveform shown in FIG. 2 is an example of the electrical signal provided on phase powerlines 32, 33, and 34 of servo motor 1 (FIG. 1) to the windings of the phases of stators U, V, W in servo motor 1 (e.g., a PMSM). In a synchronized status, the faster the rotational speed, the higher the amplitude of the waveform, which also brings a higher frequency of the sinusoidal waves.

The horizontal axis of the upper portion of FIG. 2 plots electrical angle. There is a transformation relation from the electrical angle to the mechanical angle of the rotor according to the amount of pole pairs on the rotor, which is given by equation 1.

$$\text{Mechanical Angle}=\text{Electrical Angle}/\text{pairs of magnetic poles on rotor} \quad (1)$$

Then, in a synchronized situation, the rotor always keeps a 90-degree fixed angle relation to the rotational magnetic field caused by the electrical signal (e.g., waveform) on the armature windings of each phase to keep the torque in rotation or static. Hence, by detecting (e.g., measuring, sensing, etc.) the waveform in FIG. 2, in a synchronized status, the rotor position may be acquired (e.g., by one or more processors analyzing the powerline signals).

Figure 3:
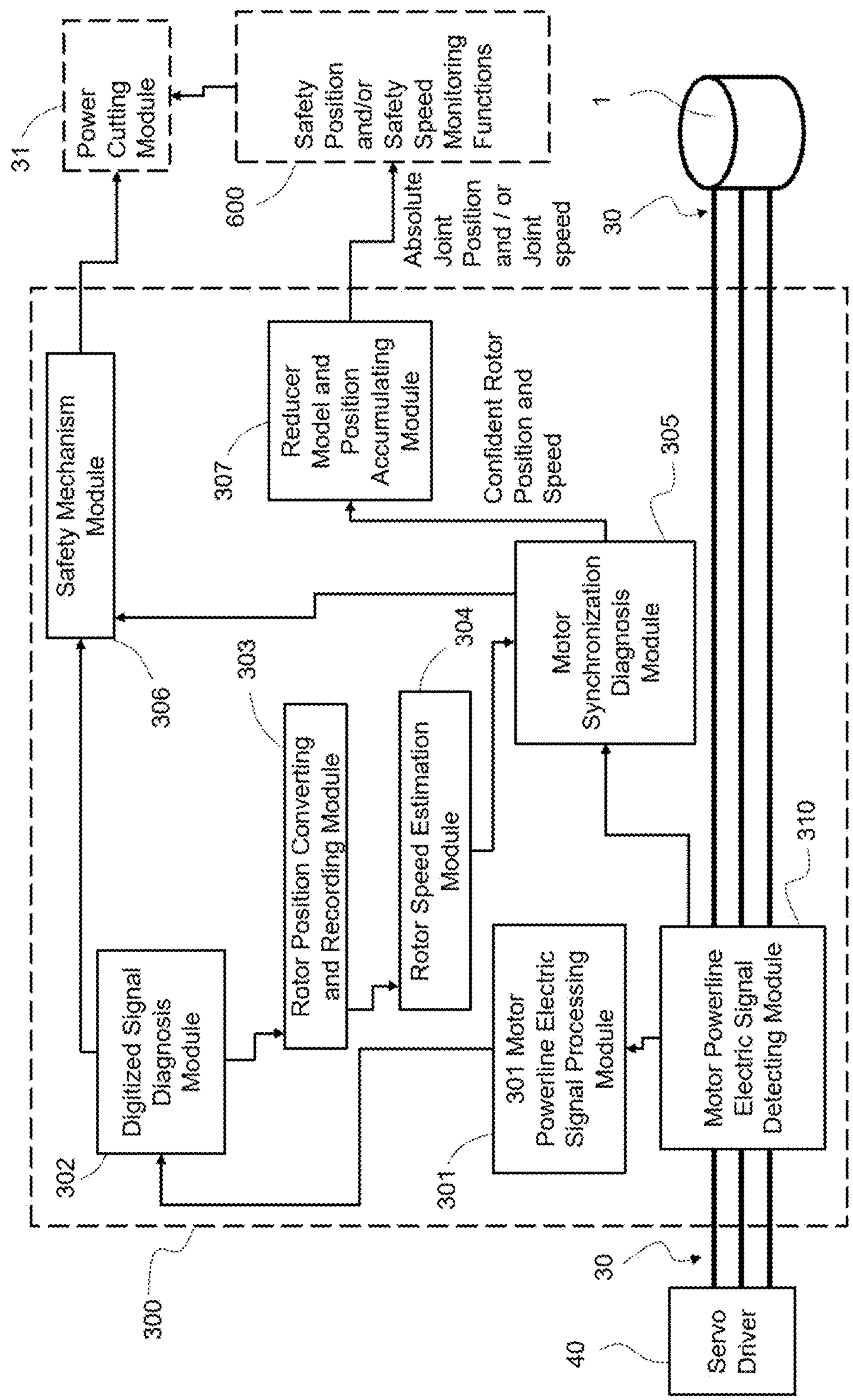
FIG. 3 is a schematic diagram of an illustrative safety apparatus for performing servo motor position monitoring in accordance with some embodiments.

FIG. 3 is a schematic diagram of an illustrative safety apparatus 300 that may be implemented in a robotic system for monitoring servo motor 1 as it drives one or more components of a robot or machine about a joint. The joint between the one or more components driven by the servo motor may sometimes be referred to herein as a servo joint that is driven by the servo motor. Safety apparatus 300 may therefore sometimes also be referred to herein as a servo joint monitoring device 300, a safety module 300, or a safety system 300.

As a servo joint monitoring device, safety apparatus 300 may monitor and generate safety rated position information associated with servo motor 1. Safety speed monitoring functions 600 may generate a safety rated reaction signal for the robot or machine based on the safety rated position information generated by safety apparatus 300. Safety speed monitoring functions 600 may, for example, be performed or implemented by an upper-level safety controller of a robot (e.g., one or more processors that control upper-level safety of the robot). Safety speed and monitoring functions 600 may include the generation of a safety rated reaction signal for the machine or robot to activate emergency or protective safety actions. In general, safety apparatus 300 and safety speed and monitoring functions 600 may include safety actions. The emergency or protective safety actions may include, for example, providing a digital input/output (I/O) signal to a power cutting module 31 of the machine or robot. The digital I/O signal may instruct power cutting module 31 to cut power to one or more components of the robot. Safety apparatus 300 may include several functional modules. While shown separately from safety apparatus 300 in FIG. 3, safety apparatus 300 may include or perform safety position and/or safety speed monitoring functions 600 and/or may include power cutting module 31 as part of its functional modules.

Safety apparatus 300 may be coupled to powerlines 30 of servo motor 1. Servo motor 1 may be driven by servo driver 40 over powerlines 30 (e.g., servo motor 1 may provide driving signals (electrical currents) to servo motor 1 over powerlines 30). Powerlines 30 may be integrated into a power chord for robot 9. Powerlines 30 may, for example, include U, V, W wiring (e.g., phase powerlines 32-34 of FIG. 1) to provide power to a PMSM such as servo motor 1. Powerlines 30 may therefore sometimes also be referred to herein as multiple phases of powerlines or as phased powerlines 30 (e.g., powerlines having electrical signals of different predetermined phases thereon). Servo driver 40 may sometimes be referred to herein as driver 40 or control circuit 40. Servo motor 1 and servo driver 40 may be incorporated or integrated into a machine or robot. Servo driver 40 may use the driving signals (electrical currents) on powerlines 30 to control servo motor 1 to move, rotate, or drive one or more components of the robot or machine about a corresponding joint (e.g., to move, drive, acuate, or rotate the joint).

As shown in FIG. 3, safety apparatus 300 may include functional modules such as modules 301-310. The functional modules of safety apparatus 300 may monitor the electrical signals conveyed over powerlines 30. The functional modules of safety apparatus 300 may be implemented using one or more digital logic elements, one or more processors, one or more central processing units (CPUs), one or more digital signal processors (DSPs), one or more microcontroller units (MCUs), one or more application specific integrated circuits (ASICs), one or more field programmable gate arrays (FPGAs), one or more analog components, one or more electrical components, and/or one or more sensors. The functional modules may be implemented in hardware (e.g., using dedicated hardware, logic, and/or gates), software (e.g., as stored on storage such as one or more hard drives, flash drives, read only memory, random access memory, removable storage media, etc. and as executed by one or more processors), and/or firmware.

As shown in FIG. 3, safety apparatus 300 may include a motor powerline electric signal detecting module 310. Motor powerline electrical signal detecting module 310 may include measurement circuitry that detects or sense electrical signals on powerlines 30. The electrical signals on powerlines 30 may, for example, include three sinusoidal signals with phases shifted by 120 degrees to each other (e.g., as shown in the upper portion of FIG. 2). Motor powerline electric signal detecting module 310 may include electrical components such as one or more current and/or voltage sensors, for example.

Safety apparatus 300 may include motor powerline electric signal processing module 301. Motor powerline electric signal processing module 301 may transfer (convert) the signal on powerlines 30 from the analog domain into a corresponding digital signal in the digital domain. Motor powerline electrical signal processing module 301 may, for example, include one or more sensors within motor powerline electric signal detecting module 310. In other implementations, motor powerline electrical signal processing module 301 may include analog-to-digital converter (ADC) channels that directly sample the signals (e.g., analog sinusoidal signals generated by the servo motor) and/or may include pulse width detection channels (e.g., for detecting a high frequency space vector pulse-width modulation signal, or a SVPWM signal which is the microscopic source of the analog sinusoidal signals of a servo driver that utilize the SVPWM technology) that directly sample the signals of the one or more processor in the motor powerline electric signal processing module 301. If desired, the detected electrical signal may be transformed to a binary signal (e.g., the digital high or low (H/L) signal shown in the lower portion of FIG. 2) using computations performed by one or more processor and/or using analog circuits (e.g., a zero-crossing detection circuit) within safety apparatus 300. The binary signal then may be combined to a digitized signal group or just digitized signal values, shown in the lower portion of FIG. 2 (e.g., 1,0,1; 1,0,0; 1,1,0 . . . ). Motor powerline electric signal processing module 301 may transmit the digitized signal values to digitized signal diagnostic module 302 (FIG. 3).

Regarding the resolution of position detection, referring to the example of the model of a PMSM in FIG. 1, because there is only a pair of magnetic poles mounted on the rotor, according to equation (1), the relation is, within one full rotation of the rotor, there will be 360 degrees of electrical angle. Referring to the combination of three phases (the U, V, W) shown in FIG. 1, in a single motor rotation, there will be six combinations of binary signal, or six digitized signal groups. In a more often shown design of a servo motor of a robot, there may be five pairs of magnetic poles on the rotor, which includes 30 equal sections of rotor angle within a full rotation of the motor. When the monitored servo motor is connected with a reducer or a gearbox (e.g., having a 100-reduction ratio), the final joint angle will have 3,000 divides/sections in a round of joint rotation, or a resolution of 0.12 degrees. This is sufficient for a safety position/speed monitoring for most industrial robots.

As shown in FIG. 3, safety apparatus 300 may include a digitized signal diagnostic module 302, which may be coupled to motor powerline electric signal processing module 301. Digitized signal diagnostic module 302 may receive the digitized signal group from motor powerline electric signal processing module 301 and may perform diagnostic functions based on the digitized signal group. Herein a diagnostic means is disclosed to monitor the change between an acquired and last-digitized signal group. The digitized signal group according to the example in FIG. 2 can be shown in the table below:

TABLE 1

The orders of Digitized Signal Group

| Order | Digitized Signal Group | | |
|---|---|---|---|
| | U | V | W |
| 1 | 1 | 0 | 1 |
| 2 | 1 | 0 | 0 |
| 3 | 1 | 1 | 0 |
| 4 | 0 | 1 | 0 |
| 5 | 0 | 1 | 1 |
| 6 | 0 | 0 | 1 |

Table 1 shows 6 types of digitized signal group. First, the (0,0,0) and (1,1,1) are abnormal cases for a PMSM, which may be the basic diagnostic function. Second, when the sampling frequency is arranged properly that each of the one-order change of the digitized signal group can be surely seen from the speed=0 to the maximum rotational speed of the motor (e.g. at least twice the frequency of the change of the order calculated from maximum motor rotational speed) then checking if the change of the digitized signal group follows the order shown in table 1 may be used to construct another diagnostic function. For example, if the diagnosis function found that the last-digitized signal group is order 1, and the current digitized signal group is order 3, it is then judged as an abnormal case by diagnosis function. This case may be caused by open/short of some circuit of servo motor 1, or a fault occurring in a non-safety part of the robot such as in servo driver 40. Other than checking if the difference is within one step, checking if the difference is within a set amount of steps may work, and if desired, may be enhanced with a continues monitoring of a bigger trend of the shifting of between the digitized signal groups.

In cases where there is no control current, for example, when the motor is rotated by external force/torque (e.g., gravity), or a constant speed rotating inertia moment, or the case of Cat.0 stop that the power is cut, the rotor position can still be acquired by the voltage pattern of the effect of Back-EMF, which can be detected by powerline electric signal detecting module 310 and calculated by motor powerline electric signal processing module 301 according to equation 2 to generate the digitized signal group.

$$\begin{bmatrix} V_a \\ V_b \\ V_c \end{bmatrix} = \begin{bmatrix} R & 0 & 0 \\ 0 & R & 0 \\ 0 & 0 & R \end{bmatrix} \begin{bmatrix} i_a \\ i_b \\ i_c \end{bmatrix} + \begin{bmatrix} L & 0 & 0 \\ 0 & L & 0 \\ 0 & 0 & L \end{bmatrix} \begin{bmatrix} \frac{d}{dt} i_a \\ \frac{d}{dt} i_b \\ \frac{d}{dt} i_c \end{bmatrix} + K_e \omega \begin{bmatrix} -\sin\theta \\ -\sin\left(\theta - \frac{2\pi}{3}\right) \\ -\sin\left(\theta + \frac{2\pi}{3}\right) \end{bmatrix} \quad (2)$$

In equation 2, $V_a$, $V_b$, and $V_c$ are the phase voltage of each stator, R and L are the resistance and inductance of the armature windings, $i_a$, $i_b$, $i_c$ are the phase currents, $K_e$ is the Back-EMF constant, $\omega$ is the rotation speed of the rotor, and $\theta$ is the electrical angle.

In the motor powerline electric signal processing module 301, the choice of using the waveform of Back-EMF or the control current may be made based on the amplitude of the current, the rotational speed, and/or the status of whether it triggered a Cat. 0 stop already, to become a switch of decision.

It should be noted that the method disclosed above by digitizing the waveform on the powerlines to a H/L signal and then to the binary combination is just one of the methods to acquire the control result of the electrical part and the synchronized rotor position. It also can be realized by other means such as a detailed sampling to the wave form and can still be diagnosed by the same idea of the design used in the embodiment of the digitized signal diagnostic module 302 here. Digitized signal diagnosis module may perform a digitized signal diagnosis procedure on the digitized signal group received from motor powerline electric signal processing module 301.

Figure 4:
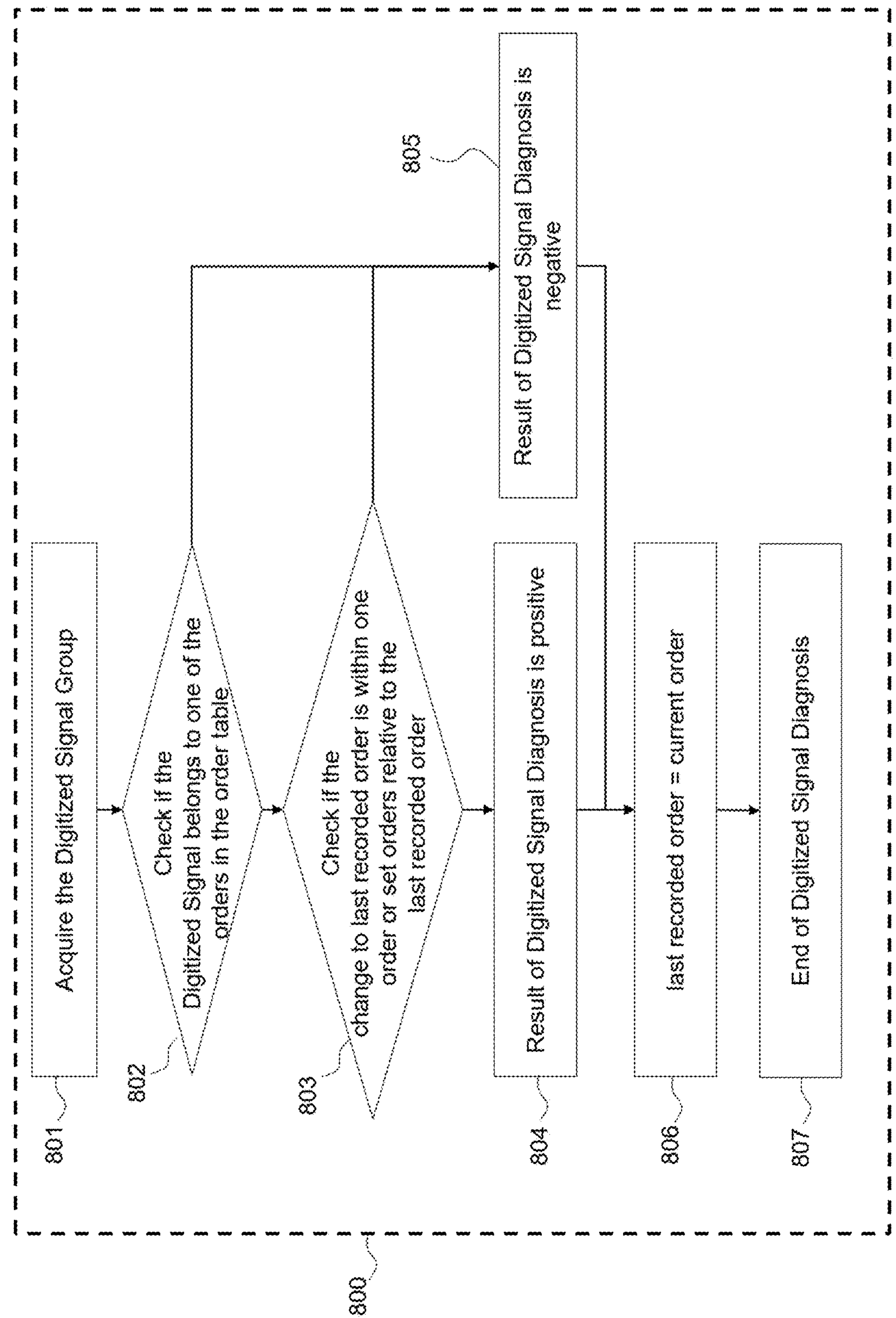
FIG. 4 is a flow chart of illustrative operations involved in performing digitized signal diagnosis in accordance with some embodiments.

FIG. 4 is a flow chart of illustrative operations that may be processed by safety apparatus 300 to perform an exemplary digitized signal diagnosis procedure 800 based on the digitized signal group received from motor powerline electric signal processing module 301. At operation 801, motor powerline electrical signal detecting module 310 and motor powerline electric signal processing module 301 may acquire the digitized signal group from powerlines 30.

At operation 802, digitized signal diagnosis module 302 may detect whether a digitized signal fault is present based on the digitized signal group. For example, digitized signal diagnosis module 302 may detect whether the digitized signal group belongs to one of the orders in the order table (e.g., Table 1). If the digitized signal group does not belong to any in the 6 orders of the order table, which means that (0,0,0) and (1,1,1) are received, safety apparatus set the result of digitized signal diagnostic as negative at operation 805 (e.g., digitized signal diagnosis module 302 may detect or determine that the digitized signal fault is present). If the digitized signal group belongs to one of the 6 orders, processing may proceed from operation 802 to operation 803 (e.g., digitized signal diagnosis module 302 may detect or determine that there is no digitized signal fault present or that the digitized signal is fault-free). At operation 802, digitized signal diagnosis module 302 may determine whether the change to the last-recorded order is within one order or set orders according to the design relative to the last recorded order. If not, safety apparatus may set the result of digitized signal diagnostic as negative (at operation 805). If the change to the last-recorded order is within one order or set orders according to the design relative to the last recorded order, safety apparatus 300 may set the result of digitized signal diagnostic as positive (at operation 806) and may end the digitized signal diagnostic (at operation 807).

Referring back to FIG. 3, after the digitized signal diagnostic performed, if the result is negative (e.g., if operation 805 of FIG. 4 is performed, indicative of the detection of the presence of a digitized signal fault), digitized signal diagnostic module 302 may trigger safety mechanism module 306 in safety apparatus 300 to perform one or more safety actions. For example, safety mechanism module 306 may send out a power cutting signal to the power cutting/switch module 31 to cut the power on powerlines 30 or to cut the power provided to the inverter of servo driver 40.

If the result of the digitized signal diagnostic is positive (e.g., if operation 804 of FIG. 4 is performed, indicative of the detection that a digitized signal fault is not present), then digitized signal diagnosis module 302 may transmit the digitized signal group to rotor position converting and recording module 303. Rotor position converting and recording module 303 may convert the digitized signal group to the corresponding rotor position. Rotor speed estimation module 304 may then generate the rotor speed according to multiple recent recorded rotor positions recorded by rotor position converting and recording module 303 (e.g., using a speed estimator). Then, the estimated rotor position and speed may be transmitted to motor synchronization diagnostic module 305 in safety apparatus 300. Motor synchronization diagnosis module 305 may perform a synchronization diagnostic by combining the estimated rotor position and/or speed with the necessary electrical information obtained from powerlines 30.

Figure 5:
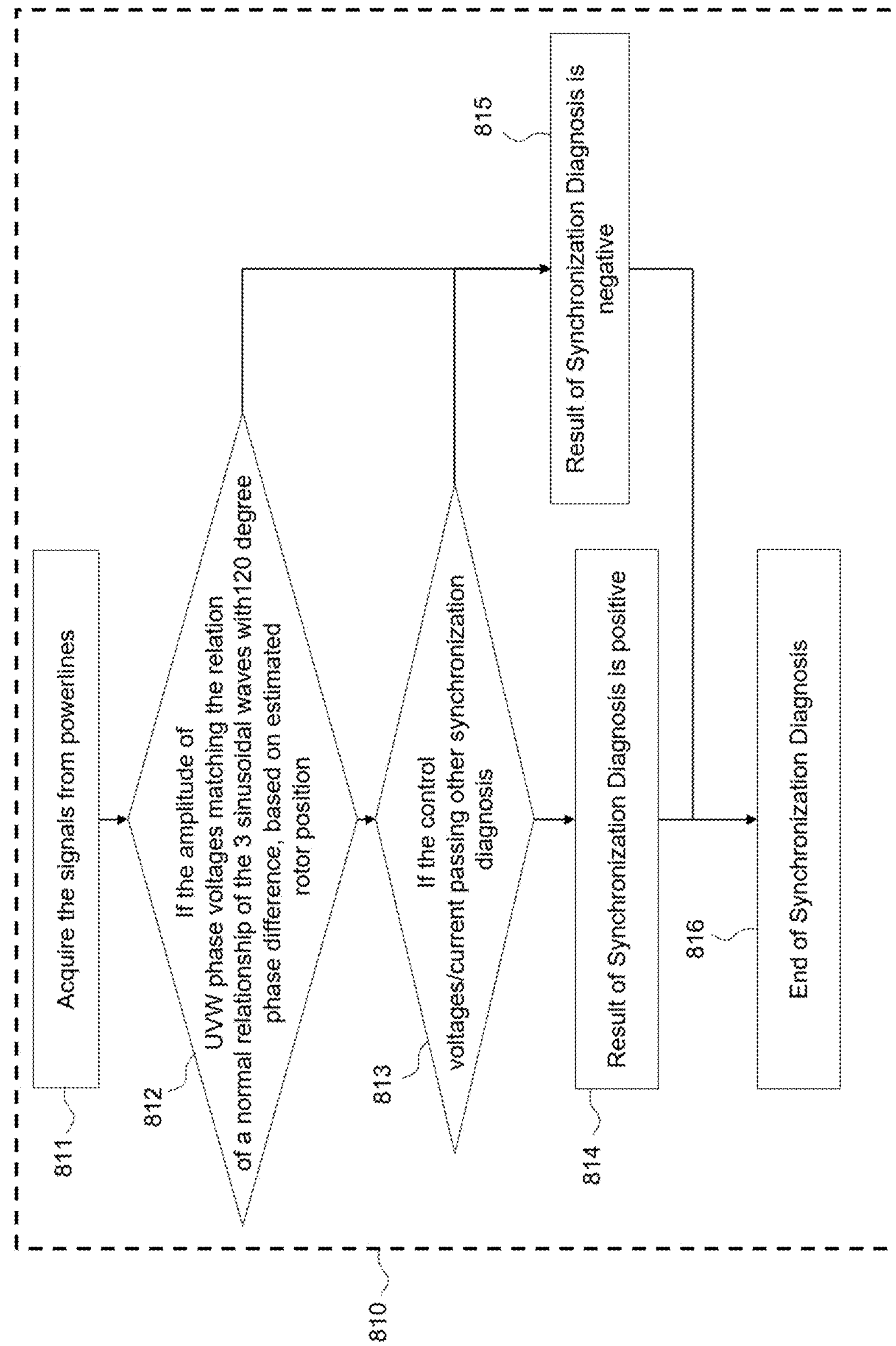
FIG. 5 is a flow chart of illustrative operations involved in performing synchronization diagnosis in accordance with some embodiments.

FIG. 5 is a flow chart of illustrative operations that may be processed by motor synchronization diagnosis module 305 to perform an exemplary synchronization diagnostic procedure 810. At operation 811 of synchronization diagnostic procedure 810, motor powerline electric signal detecting module 310 may acquire the necessary signals from powerlines 30. For example, motor powerline electric signal detecting module 310 may measure (e.g., sense) the waveform of the voltage or current on powerlines 30. Motor powerline electric signal detecting module 310 may transmit the acquired signals to motor synchronization diagnostic module 305.

At operation 812, motor synchronization diagnosis module 305 may determine whether the amplitude of the U, V, W phase voltages acquired by motor powerline electric signal detecting module 310 match or exhibit a nominal relationship such as a 120 degree phase difference between the 3 sinusoidal waves shown in FIG. 2). Additionally or alternatively, motor synchronization diagnosis module 305 may determine whether the amplitude of the U, V, W phase voltages match the relationship of the estimated rotor position and/or speed (e.g., the relationship shown in FIG. 2). Put differently, motor synchronization diagnosis module 305 may detect whether the servo motor is synchronized or unsynchronized based on the detected electric signal.

If the signal acquired from powerlines 30 matches the nominal relationship or the relationship of the estimated rotor position and/or speed, motor synchronization diagnosis module 305 may set the result of the synchronization diagnostic as positive (at operation 814). A positive result may be indicative of servo motor operating in a synchronized state or with a synchronized status (e.g., with a fault-free synchronization status). If the signal acquired from powerlines 30 does not match the nominal relationship or the relationship of the estimated rotor position and/or speed, motor synchronization diagnosis module 305 may set the synchronization diagnostic as negative (at operation 815). A negative result may be indicative of the servo motor operating in an unsynchronized state or with an unsynchronized status (e.g., with a fault in its synchronization status). Then, the synchronization diagnostic may end (at operation 816). If desired, other means of detecting the out-of-step or loss of synchronization of a synchronous motor, or the fault may indicates to the loss of synchronization of a synchronous motor may be performed at operation 813 to have a more complete fault detection like detecting any short or open of the UVW power lines by a simple rule of $i_a+i_b+i_c=0$ of the nature of a three-phase motor, etc.

It should be noted that the two diagnosis methods of the disclosed servo joint monitoring method and safety apparatus (i.e. the digitized signal diagnosis in a synchronized status, and the motor synchronization diagnosis according to different designs of the diagnosis technology), can be performed at the same time (e.g., concurrently or simultaneously). In the embodiments described above, it is just an exemplary design to set the digitized signal diagnosis before the motor synchronization diagnosis, to have a more confident rotor position and/or speed first, which may be used in other motor synchronization diagnosis, such as comparing the rotor position estimated from the control current and the real rotor position extracted from the back-EMF as the electric signal acquired by the motor synchronization diagnosis module to detect the loss of synchronization.

Figure 6:
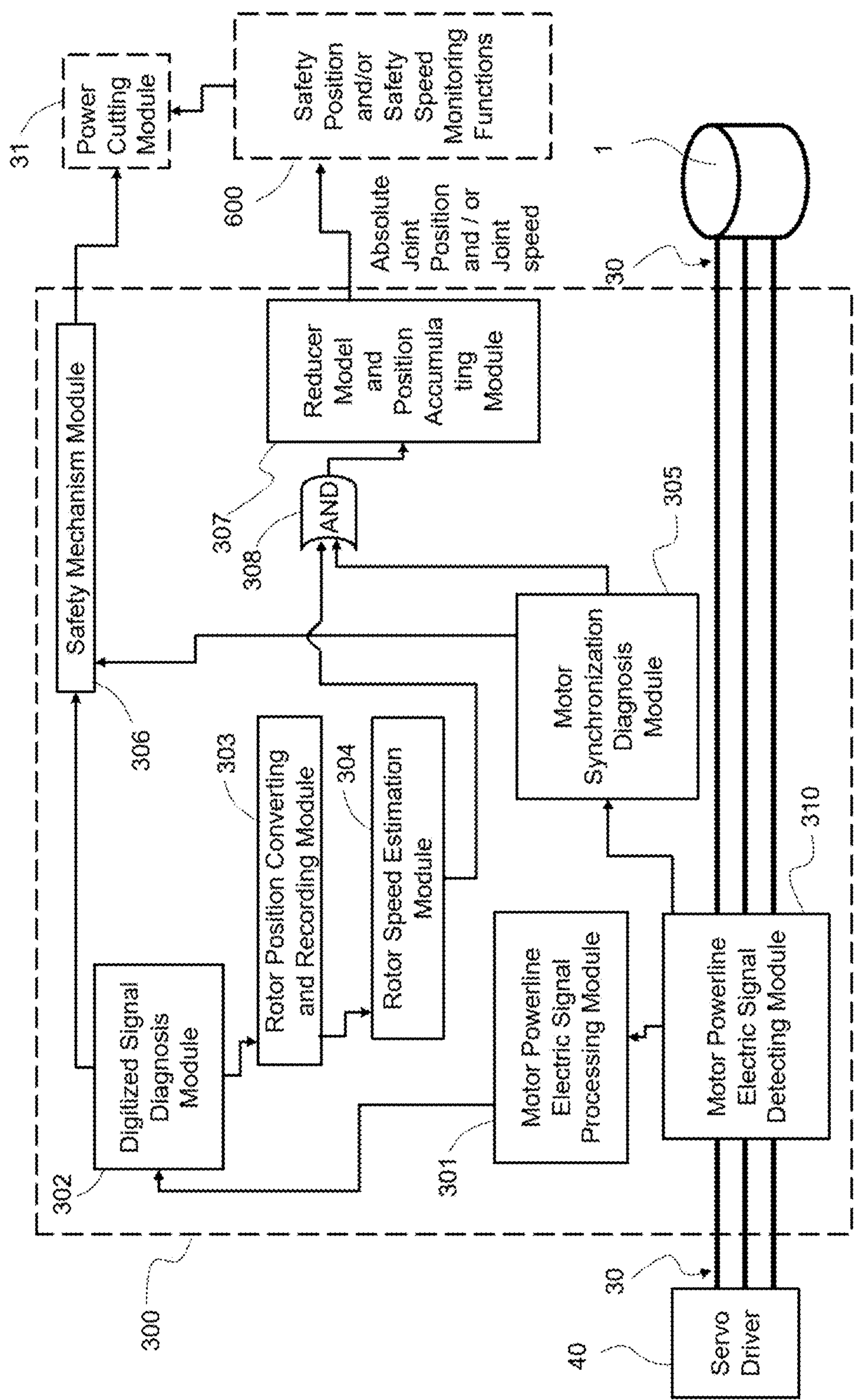
FIG. 6 is a schematic diagram of an illustrative safety apparatus for performing servo motor position monitoring using a logic AND gate coupled between a rotor speed estimation module, motor synchronization diagnosis module, and reducer model and position accumulating module in accordance with some embodiments.

FIG. 6 shows an embodiment of an alternative way to process the digitized signal diagnosis in a synchronized status and the motor synchronization diagnosis in parallel using a logic AND gate. As shown in FIG. 6, a logic AND gate 308 (sometimes referred to herein as AND module 308) may have a first input coupled to rotor speed estimation module 304 and may have a second input coupled to motor synchronization diagnosis module 305. Logic AND gate 308 may summarize the positive result to have the confident position and/or speed value (e.g., by outputting a positive result when both of its inputs are positive results and otherwise outputting a negative result). This alternative arrangement can be used when the synchronization diagnosis does not require the estimated rotor position and speed and has the advantage of separating the two diagnosis modules in different logic loops, which is simpler in the analysis of the systematic functional safety. The sequence relationship between the digitized signal diagnosis and synchronization diagnosis is merely illustrative and is non-limiting.

Returning to FIG. 3, if the result of synchronization diagnostic is negative (e.g., if operation 815 of FIG. 5 is performed), motor synchronization diagnostic module 305 may trigger the safety mechanism module 306 to perform one or more safety actions (e.g., by issuing a power cutting command to power cutting module 31). If the result of the synchronization diagnostic is positive (e.g., if operation 814 of FIG. 5 is performed), then the estimated rotor position and speed may be set as a confident rotor position and speed. Safety position and/or safety speed monitoring functions 600 may then be performed based on (using) the confident rotor position and speed.

As an example, safety apparatus 300 may include a reducer model and position accumulating module 307. Reducer model and position accumulating module 307 may accumulate the confident rotor position to an absolute joint position, thereby letting safety apparatus 300 operate like an absolute encoder. Reducer model and position accumulating module 307 may include storage modules or memory to store the absolute position to eliminate the need of localization or homing for the joints after the power cycle of the robot or machine. In the same manner, the confident rotor speed may also be transformed into joint speed, considering the reducer model, and may then be sent to safety position and/or safety speed monitoring functions 600 for implementation.

It should be noted that power cutting module 31 (sometimes also referred to as power switch module 31) and safety position and/or safety speed monitoring functions 600 may also be included in safety apparatus 300 for other purposes, such as modular design consideration of electronics and computing power arrangement for a safety chip, or different safety logic platform arrangements like the combination of a high operation frequency/high ADC resolution but simple structured signal processing safety IC and a more complicated but powerful safety logic chip or CPU. Similarly, reducer model and position accumulating module 307 may be located outside of the safety apparatus 300, such as arranged in safety position and/or safety speed monitoring functions 600.

Figure 7:
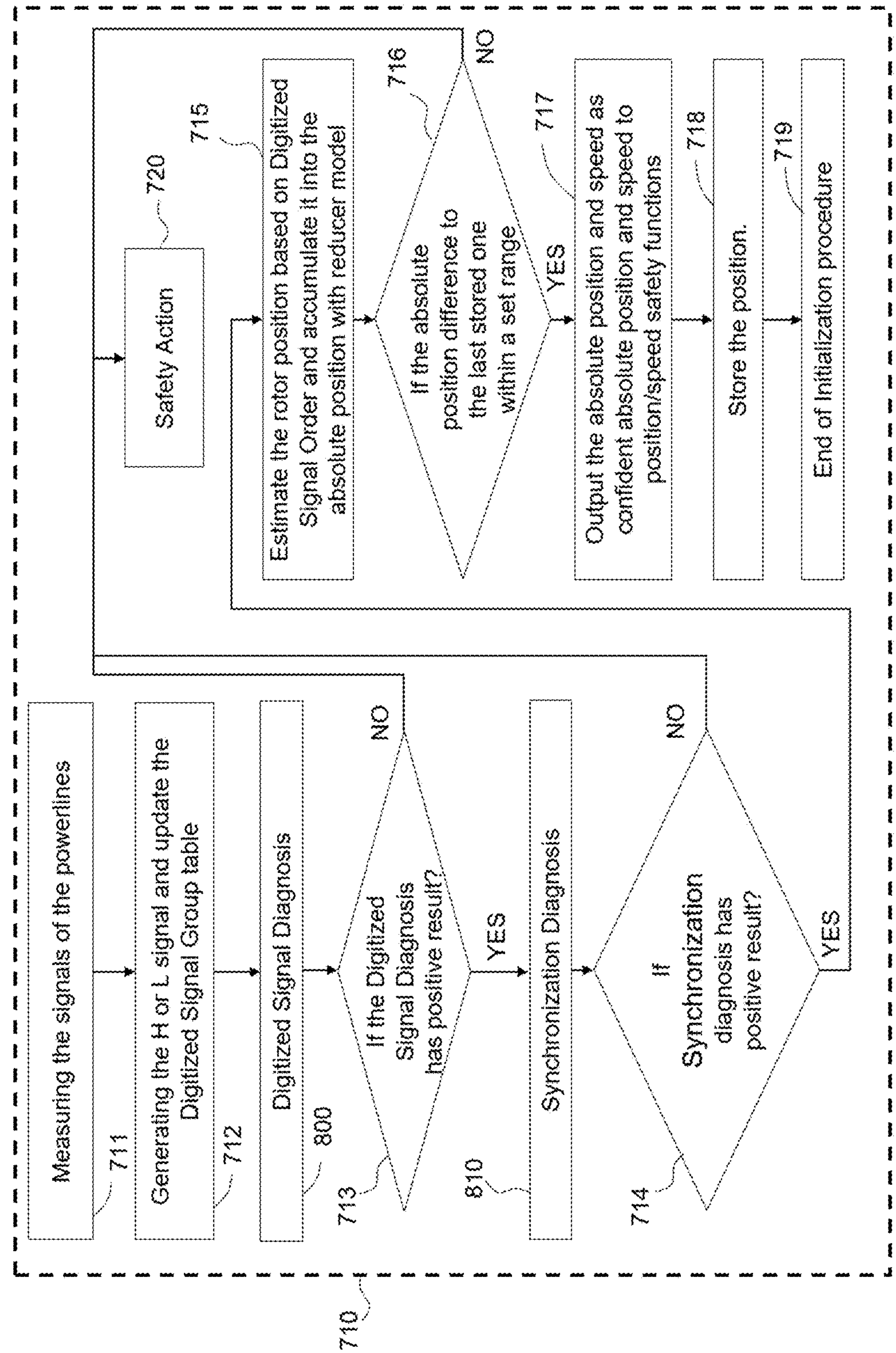
FIG. 7 is a flow chart of illustrative operations involved in performing an initialization procedure in accordance with some embodiments.

Safety apparatus 300 may perform an initialization procedure such as initialization procedure 710 of FIG. 7 (e.g., during the absolute position described above and/or during the booting procedure of the corresponding robot or machine). At operation 711, safety apparatus 300 may measure the signals on powerlines 30. At operation 712, safety apparatus 300 may generate the digitized signal group and update the digitized signal group table. Safety apparatus 300 (e.g., digitized signal diagnosis module 302) may then perform digitized signal diagnosis procedure 800 (sometimes referred to herein as digitized signal diagnosis 800), as shown in FIG. 4.

At operation 713, safety apparatus 300 may determine whether digitized signal diagnosis procedure 800 had a positive result or a negative result. If digitized signal diagnosis module 302 outputs a negative result during digitized signal diagnosis procedure 800 (e.g., if operation 805 of FIG. 4 is performed), processing may proceed to operation 720. If digitized signal diagnosis module 302 outputs a positive result during digitized signal diagnosis procedure 800 (e.g., if operation 804 of FIG. 4 is performed) processing may proceed to operation 810.

At operation 810, safety apparatus 300 (e.g., motor synchronization diagnosis module 305) may perform synchronization diagnosis 810 (sometimes referred to herein as synchronization diagnosis procedure 810), as shown in FIG. 5.

At operation 714, safety apparatus 300 may determine whether synchronization diagnosis 810 had a positive result or a negative result. If motor synchronization diagnosis module 305 outputs a negative result during motor synchronization diagnosis 800 (e.g., if operation 815 of FIG. 5 is performed), processing may proceed to operation 720. If motor synchronization diagnosis module 305 outputs a positive result during motor synchronization diagnosis 800 (e.g., if operation 814 of FIG. 5 is performed) processing may proceed to operation 715. At operation 720, safety mechanism module 306 may perform one or more safety actions (e.g., cutting power to the robot using power cutting module 31).

At operation 715 (e.g., when the synchronization diagnostic has a positive result and when the digitized signal diagnosis has a positive result, meaning the estimated rotor position has passed all diagnoses), safety apparatus 300 may estimate the rotor position based on the digitized signal order (e.g., as generated by motor powerline electric signal processing module 301 and/or digitized signal diagnosis module 302) and may use reducer model and position accumulating module 307 to accumulate the estimated rotor position into the stored absolute position of servo motor 1.

Safety apparatus 300 may identify (e.g., compute, calculate, etc.) an absolute position difference between the absolute position accumulated (generated) by reducer model and position accumulating module 307 and the last-stored absolute position accumulated (generated) by reducer model and position accumulating module 307. At operation 716, safety apparatus 300 may compare the absolute position difference to a set range of acceptable absolute position differences (e.g., a maximum absolute difference threshold value). If the absolute position difference falls outside the set range of acceptable absolute position differences (e.g., exceeds the maximum absolute difference threshold value), processing may loop back to operation 720 and one or more safety actions may be performed. The absolute position difference may fall outside of the set range when there is abnormal rotation (e.g., by an external force during the power off status of the machine), for example. The continuity of the absolute position can also be ensured by making the safety apparatus equipped with a battery to continue monitoring the position by the method to detect rotor position without control current described above.

If the absolute position difference falls within the set range of acceptable absolute position differences (e.g., is less than the maximum absolute difference threshold value), processing may proceed from operation 716 to operation 717. At operation 717, reducer model and position accumulating module 307 may output the absolute position and/or speed (i.e., the current or most-recently measured absolute position and/or speed) as a confident absolute position and/or speed to safety position and/or safety speed monitoring functions 600. Reducer model and position accumulating module 307 may additionally or alternatively store the confident absolute position and/or speed for future processing (at operation 718). Safety position and/or speed monitoring functions 600 may then be performed based on the confident absolute position and/or speed of servo motor 1 as generated by safety apparatus 300.

It should be noted that the methods and apparatus disclosed in the embodiments not only can be used on PMSM, and can be used on other synchronized motor such as brushless direct current (BLDC) motors (e.g., because similar techniques can be used to acquire rotor position from a BLDC motor by measuring the electrical signal like current from the power lines of the motor and converting them into the digitized signal to generate rotor position, and because similar techniques can be used to measure the rotor speed from the electrical signal from the power lines, which can be used in for the diagnosis of the synchronization of the motor).

Functional safety can be achieved by the diagnosis of the detection of loss of synchronization by the motor synchronization diagnosis module and may further enhanced by the diagnosis performed by the digitized signal diagnosis module. In other words, the logic of position and/or speed safety from systems that compare the control command and result (e.g., encoders mounted on motors) or that compare between a dual channel result may be converted into logic that monitors the final control mean (e.g., the electrical signal of U, V, W powerlines of a PMSM) applied on the stator windings and that ensures there is no loss of synchronization between stator and rotor of the motor. Therefore, monitoring the powerline control signal is equivalent to monitoring the rotor position and/or speed, as long as the loss-of synchronization can be excluded.

Safety apparatus 300 may also easily be used to construct a dual channel system by duplicating the detection of the electrical signal on the powerlines of the same motor. This makes a functional safety requirement for Cat. 3 structure or HFT=1 easier to fulfill. Further, excluding position sensors such as encoders or other complex electrical components to be integrated into the safety related part of the robot system, may result in improved safety performance and may makes it easier to reach safety performance required in regulation, e.g., PL=d or SIL2.

Figure 8:
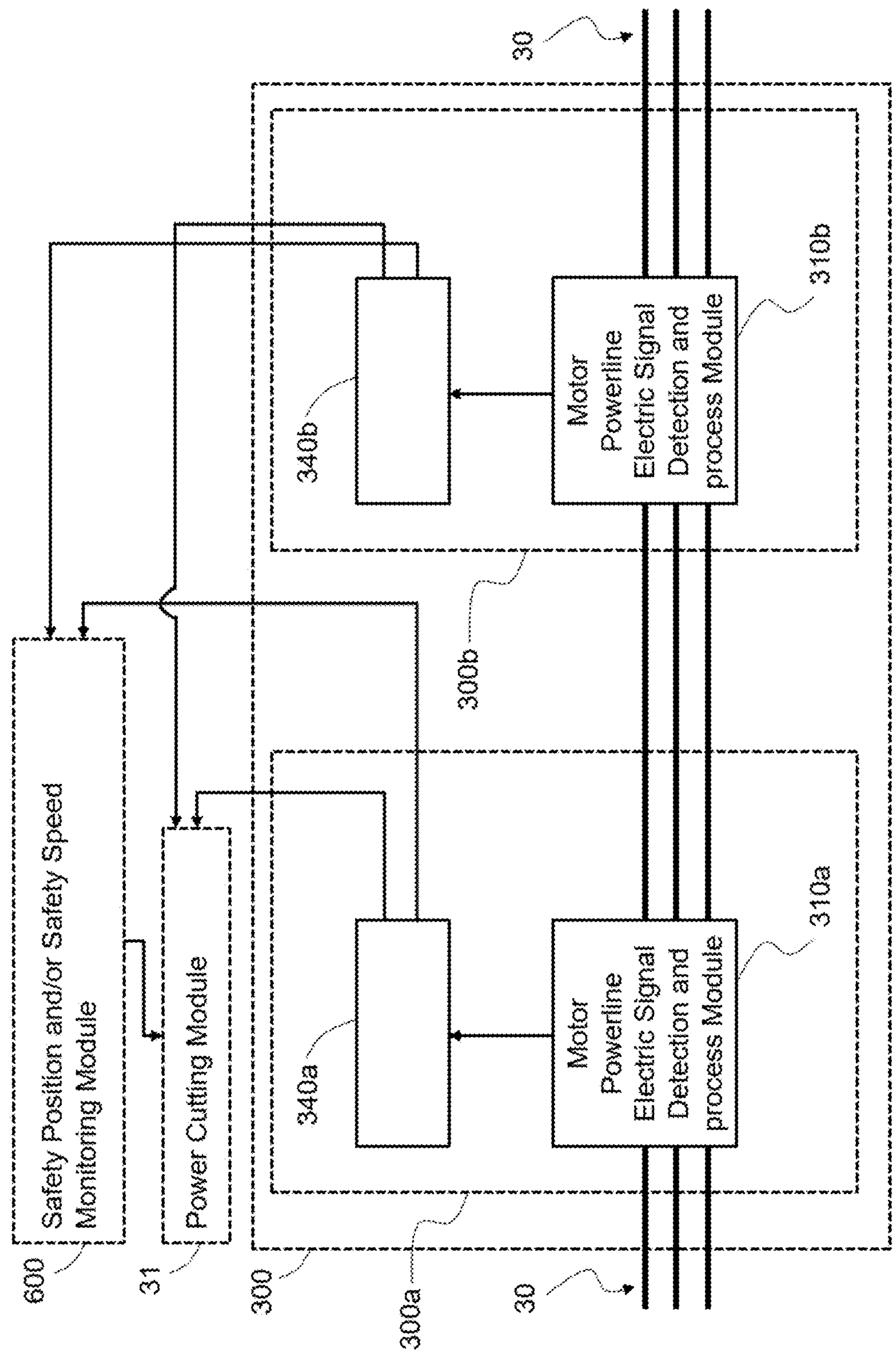
FIG. 8 is a schematic diagram showing how an illustrative safety apparatus may be incorporated into a robotic system that uses a dual-channel design in accordance with some embodiments.

FIG. 8 shows one example of how safety apparatus 300 may be implemented in a system using a dual channel structure (e.g., as defined according to ISO 13849-1 and the HFT=1 structure defined in IEC61508). As shown in FIG. 8, safety apparatus 300 may include first submodule **300*a* and a second submodule 300*b*. Submodules 300*a* and 300*b* may each include the architecture and functional modules of safety apparatus 300 as described in FIGS. 3 and 6. Submodule 300*a* may have its own motor powerline electric signal detection and process module 310*a* and submodule 300*b* may have its own motor powerline electric signal detection and process module 310*b* coupled to the powerlines 30 of the same servo motor 1. Blocks 340*a* and 340*b* may include any disclosed functional modules other than the motor powerline electric signal detection and process module 310 shown in FIGS. 3 and 6. Submodule 300*a* and submodule 300*b* may concurrently and independently measure and output a confident position and/or speed of servo motor 1 (e.g., using the functional modules and techniques described above for safety apparatus 300) and may separately provide the confident position and/or speed to safety position and/or safety speed monitoring functions 600. Each of submodules 300*a* and 300*b* may be coupled to power cutting module 31 to independently cut the power of servo motor 1 when a safety fault occurs and is detected by any of the diagnostic modules within submodule 300*a* or 300*b*. This allows safety apparatus 300 to comply exhibit a dual channel structure that complies with standardized dual channel requirements. The example of a dual channel structure is merely illustrative. In general, safety apparatus 300 may include a multi-channel structure having any desired number of two or more submodules 300***a*, 300*b*, etc. (e.g., where dual channel is a subset of multi-channel having two channels for performing the safety functions described herein).

In the example shown in FIG. 8, the safety position and/or safety speed monitoring functions 600 and power cutting module 31 is often to also be architected as a dual channel structure, like dual microprocessors for HFT=1 and Cat.3 structure, or a microprocessor with a Cat. 3 structure for the safety position and/or safety speed monitoring functions 600, and a dual cutting circuit for Power Cutting Module 31. Having a cross check between the two safety logics (e.g., submodules 300*a* and 300*b*) and the check with the output module (e.g., power cutting module 31) are not shown in this diagram for simplify the expression but is easy to construct as long as there is a dual channel main structure and should not construed as a limitation.

Figure 9:
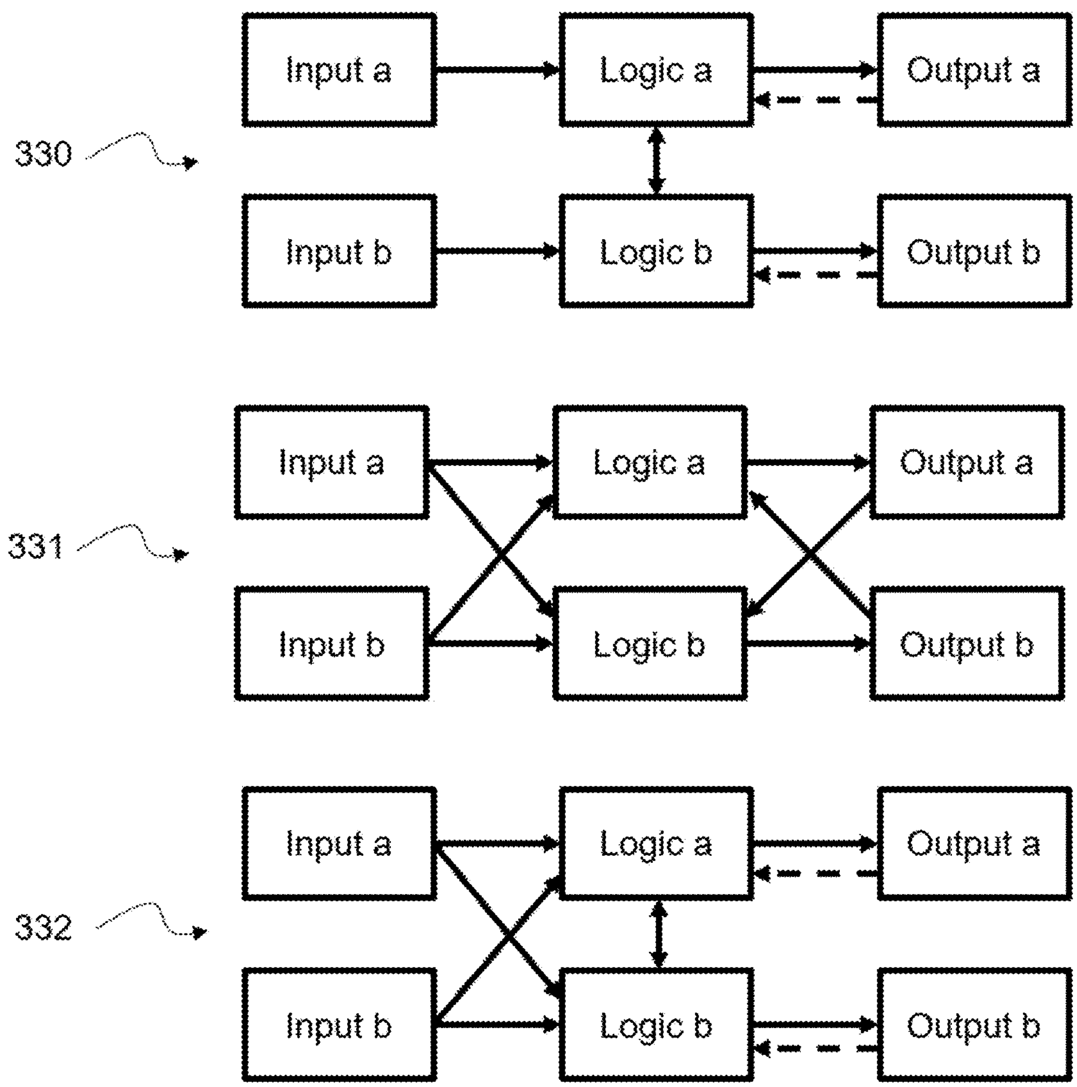
FIG. 9 is a diagram of illustrative dual-channel structures that may be used in a robotic system in accordance with some embodiments.

Several examples of the possible dual channel architectures of the safety apparatus 300 are shown in FIG. 9. Each channel is constructed by input (e.g., the functional modules in the safety apparatus 300 to detect and/or digitize the electric signals on powerlines of one or more motors), logic (e.g., the functional modules in the safety apparatus 300 to process the information and make decisions), and output (e.g., the functional modules in the safety apparatus 300 to output confident joint position and/or speed, or to cut the power or one or more motors). Architecture 330 shows a classical dual channel structure while there is a cross check between Logic a and Logic b for the comparison for inputs, outputs, and/or the result of safety logics. Architecture 331 shows an equivalent structure of dual channel system that safety logics cross monitoring each input and output. Architecture 332 shows another structure that is the combination of the architectures 330 and 331. Comparing FIG. 8 with FIG. 9, the submodules 310 *a/b* in FIG. 8 may be equivalent to Input a/b in FIG. 9, blocks 340 *a/b* in FIG. 8 may be equivalent to Logic a/b in FIG. 9, and power cutting module 31 with a dual channel structure may be equivalent to Output a/b in FIG. 9. It should be noted the safety position and/or safety speed monitoring functions 600 may also be designed and duplicated in Logic a/b and included in the safety apparatus 300, for a more complete design that may work as a standalone safety module that may perform safety position and/or safety speed monitoring functions without an upper-level safety controller.

Figure 10:
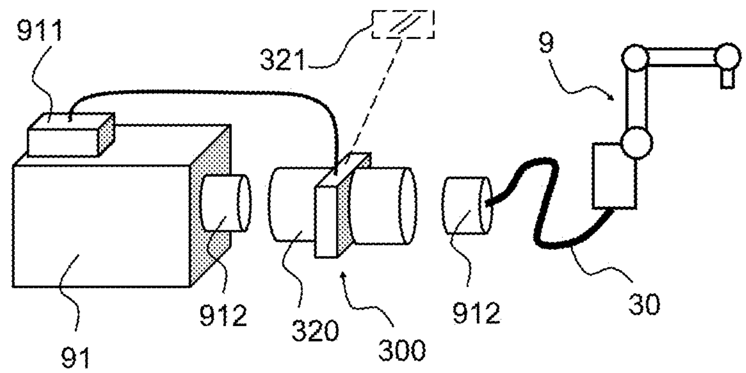
FIG. 10 is a perspective view showing how an illustrative safety apparatus may be coupled to a non-modified robot in accordance with some embodiments.
Figure 11:
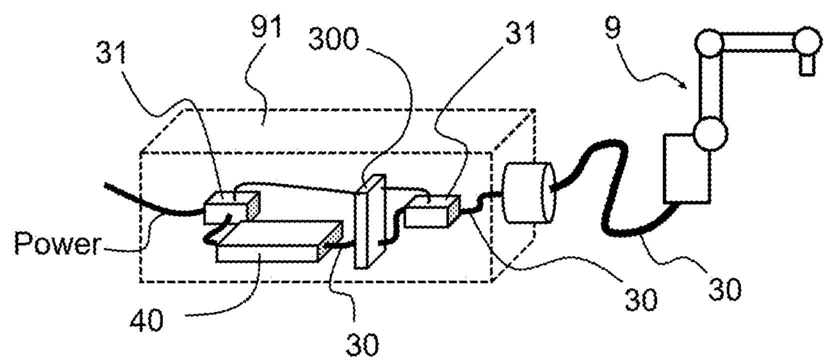
FIGS. 11 and 12 are perspective views showing how an illustrative safety apparatus may be incorporated within a robot in accordance with some embodiments.
Figure 12:
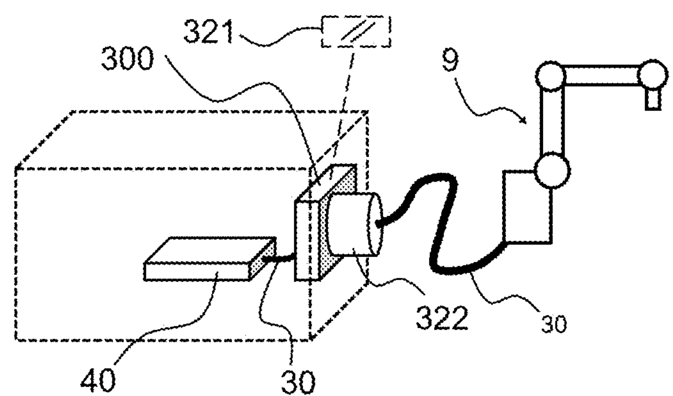

FIGS. 10-12 show three examples of how safety apparatus 300 may be integrated with a corresponding machine such as robot 9. Robot 9 may be an industrial robot such as a robotic arm. Robot 9 may operate in a robotic system. Robot 9 may operate in HRC in close proximity to one or more humans. Robot 9 may have one or more robot components (e.g., linkages, tools, etc.). Robot 9 may include a servo motor 1 that drives (e.g., moves, rotates, etc.) one or more of the robot components about one or more corresponding joints. The joints may include an elbow joint, a shoulder joint, and/or a wrist joint, as examples. Robot 9 may be controlled using one or more controllers mounted within a control box 91 (e.g., within a housing or enclosure for control box 91). Control box 91 may be coupled to robot 9 over powerlines 30. A powerline connector 912 may couple powerlines 30 to the circuitry within control box 91. Control box 91 may be located at or adjacent robot 9 or may be located away from robot 9.

In the example of FIG. 10, safety apparatus 300 is disposed external to robot 9 and control box 91 (e.g., is not integrated within the housing or enclosure of robot 9 or within the housing or enclosure of control box 91). In this example, safety apparatus 300 may be installed, attached, affixed, or coupled to robot 9 and/or control box 91 after control box 91 and/or robot 9 have been installed in the corresponding robot system (e.g., in an industrial, commercial, or warehouse system). As shown in FIG. 10, an adaptor 320 may be used to electrically and mechanically couple safety apparatus 300 between robot 9 and control box 91. Adaptor 320 (sometimes referred to herein as powerline adaptor 320 or connector 320) may be a coaxial adaptor having the same mechanical and electrical interface of powerline connector 912, for example. Adaptor 320 may allow safety apparatus 300 to be secured between a powerline connector 912 on control box 91 and a corresponding (e.g., mating) powerline connector 912 on powerlines 30, while electrically coupling safety apparatus 300 to the power lines 30 between control box 91 and robot 9. In other words, safety apparatus 300 may be coupled or interposed on the powerline 30 between robot 9 and control box 91 (e.g., external to control box 91 and robot 9 and using adaptor 320).

Safety apparatus 300 may be electrically coupled to a safety stop input port 911 of robot 9 over a control path or line (e.g., a safety stop port of emergency stop circuits on control box 91). Safety apparatus 300 may acquire the electrical signal on powerline 30 via adaptor 320 to perform the monitoring of safety position and/or speed (e.g., as described above) and may, if necessary, trigger the safety stop through connection with the safety stop input port 911 of the robot. Herein the effectiveness and the convenience of adding the safety apparatus disclosed in the invention is shown clearly. The robot does not need to equip safety encoder, and the safety apparatus does not need to connect to any internal motion command or signal of the encoder of the robot system. The safety apparatus can be an easy-to-attach option for the robot, while the original robot does not require any change or modification in hardware and/or software.

If desired, adaptor 320 may include or a power cutting module 321 that can cut the power on powerlines 30 directly, independent to the original safety system of the robot. Furthermore, on the powerlines of an industrial robot, there are often brake power wirings inside the powerlines 30. In these implementations, safety apparatus 300 may further include a safety brake control (SBC) safety function to perform a brake action (e.g., cut the power of the brakes which only release when power is provided, with a dual channel power cutting structure) at the same time, before, or a set period of time after safety power cutting to the motor's power (e.g., while performing the safety action described herein).

In the example of FIG. 11, safety apparatus 300 is incorporated (integrated) into control box 91. For example, safety apparatus 300 may be mounted in control box 91 between servo driver 40 and powerline 30 and may have a (control) signal connection to power cutting module 31 in control box 91. The power cutting module usually has two choices of position to mount, to cut the power after the servo driver, or to cut the power provided to the servo driver (e.g., the power of the whole servo driver, or the power provided to the inverter inside the servo driver).

In the example of FIG. 12, safety apparatus 300 is mounted within control box 91 and includes a power cutting module 321 and a powerline connector 322. This design embeds all portions of the safety apparatus at a common position and mounted inside the control box to provide a more compact built-in integration. It also exhibits a modular design that when considering the optional arrangement of the robot product, to exchange the safety apparatus to a regular module that does not have the position/speed safety functions for a regular model that does not have these optional safety functions.

In on illustrative example, an apparatus for monitoring a servo joint controlled by a servo driver coupled to a servo motor having armature windings and a rotor over powerlines having multiple phases may be provided, the apparatus comprising: measurement circuitry configured to detect an electric signal on the powerlines; and one or more processors are configured to convert the electric signal detected by the measurement circuitry into a digitized signal group, convert the digitized signal group into an estimated rotor position of the servo motor, perform a digitized signal diagnostic procedure based on the digitized signal group that diagnoses whether the digitized signal includes a fault, perform a motor synchronization diagnostic procedure based on the electric signal detected by the measurement circuitry that diagnoses whether the servo motor is in a synchronized state, convert the estimated rotor position into a confident rotor position when the digitized signal diagnostic procedure diagnoses that the digitized signal is fault-free and the motor synchronization diagnostic procedure diagnoses that the servo motor is in the synchronized state, and generate a signal to cut power to the servo motor when the digitized signal diagnostic procedure diagnoses that the digitized signal includes the fault or when the motor synchronization diagnostic procedure diagnoses that the servo motor is in an unsynchronized state, wherein the motor synchronization diagnostic procedure checks whether a magnitude of phase voltages on the powerlines matches a magnitude relationship of the phase voltages of three sinusoidal waves separate with a 120 degrees phase difference based on the estimated rotor position and diagnoses that the servo motor is in the unsynchronized state when the magnitude of the phase voltages does not match the magnitude relationship of the phase voltages of three sinusoidal waves separate with a 120 degrees phase difference.

The foregoing is merely illustrative and various modifications can be made by those skilled in the art without departing from the scope and spirit of the described embodiments. The foregoing embodiments may be implemented individually or in any combination.

What is claimed is:

1. A method of monitoring a servo joint, the servo joint being driven by a servo driving system comprising a servo motor having a stator with armature windings and a rotor, a servo driver, and powerlines having multiple phases and coupling the servo driver to the servo motor, the method comprising:

detecting an electric signal on the powerlines;

converting the detected electric signal into a digitized signal group;

converting the digitized signal group into an estimated rotor position;

detecting whether the servo motor is in a synchronized state or an unsynchronized state based on the detected electric signal;

outputting the estimated rotor position as a confident rotor position when the servo motor is detected in the synchronized state; and cutting power to the servo motor when the servo motor is detected in the unsynchronized state.

2. The method of claim 1, further comprising:

detecting, based on the digitized signal group, whether a digitized signal fault is present when the digitized signal servo driving system is in the synchronized state; and cutting power to the servo motor when the digitized signal fault is detected as present.

3. The method of claim 2, wherein detecting whether the digitized signal fault is present comprises:

comparing the digitized signal group to a predetermined set of digitized signal groups; and detecting that the digitized signal fault is present when the digitized signal group does not match any of the digitized signal groups in the predetermined set of digitized signal groups.

4. The method of claim 2, wherein detecting whether the servo motor is in the synchronized state or the unsynchronized state comprises:

comparing the digitized signal group to a previously-recorded digitized signal group; and detecting that the servo motor is in the unsynchronized state when the digitized signal group is not within a set amount of steps in a digitized group sequence associated with a waveform of a rotation of the servo motor in the synchronized state.

5. The method of claim 1, wherein detecting whether the servo motor is in the synchronized state or the unsynchronized state comprises:

comparing a magnitude of phase voltages on the powerlines to a predetermined magnitude relationship of the phase voltages for a time frame of three sinusoidal waves separated with a 120 degrees phase difference; and detecting that the servo motor is in the unsynchronized state when the magnitude of the phase voltages on the power lines does not match the predetermined magnitude relationship.

6. The method of claim 1, wherein detecting whether the servo motor is in the synchronized state or the unsynchronized state comprises:

comparing a magnitude of phase voltages on the power lines to a predetermined magnitude relationship of three sinusoidal waves separated by a 120 degrees phase difference based on the estimated rotor position; and detecting that the servo motor is in the unsynchronized state when the magnitude of the phase voltages on the power lines do not match the predetermined magnitude relationship.

7. The method of claim 1, further comprising:

converting the confident rotor position to a position of the servo joint according to a kinematic relationship between the rotor and an output of the mechanical joint.

8. The method of claim 7, further comprises:

storing the position of the servo joint; and comparing an initial joint position of the servo joint to the stored position of the servo joint; and cutting power to the servo motor when a difference between the initial joint position and the stored position of the servo joint exceeds a threshold value.

9. The method of claim 1, further comprising:

accumulating the confident rotor position to generate an absolute position when the confident rotor position exceeds one round of rotation of the rotor.

10. Apparatus for monitoring a servo joint controlled by a servo driver coupled to a servo motor having armature windings and a rotor over powerlines having multiple phases, the apparatus comprising:

measurement circuitry configured to detect an electric signal on the powerlines; and one or more processors are configured to convert the electric signal detected by the measurement circuitry into a digitized signal group, convert the digitized signal group into an estimated rotor position of the servo motor, perform a digitized signal diagnostic procedure based on the digitized signal group that diagnoses whether the digitized signal includes a fault, perform a motor synchronization diagnostic procedure based on the electric signal detected by the measurement circuitry that diagnoses whether the servo motor is in a synchronized state, convert the estimated rotor position into a confident rotor position when the digitized signal diagnostic procedure diagnoses that the digitized signal is fault-free and the motor synchronization diagnostic procedure diagnoses that the servo motor is in the synchronized state, and generate a signal to cut power to the servo motor when the digitized signal diagnostic procedure diagnoses that the digitized signal includes the fault or when the motor synchronization diagnostic procedure diagnoses that the servo motor is in an unsynchronized state.

11. The apparatus of claim 10, wherein the one or more processors are configured to perform the digitized signal diagnostic procedure based on a relationship of waveform between phase signals on the powerlines.

12. The apparatus of claim 11, wherein the digitized signal diagnostic procedure checks whether the digitized signal group belongs to a predetermined set of digitized signal groups based on a waveform relationship of the phase signals of the servo motor in the synchronized state and diagnoses that the digitized signal includes the fault when the digitized signal group does not match any of the digitized signal groups in the predetermined set of digitized signal groups.

13. The apparatus of claim 11, wherein the digitized signal diagnostic procedure checks whether the digitized signal group is within a set amount of steps of a digitized group sequence based on a waveform of a rotation of the servo motor in the synchronized state by comparing the digitized signal group to a last recorded digitized signal group and diagnoses that the digitized signal includes the fault when a difference between the digitized signal and the last recorded digitized signal group exceeds the set amount of steps.

14. The apparatus of claim 10, wherein the motor synchronization diagnostic procedure checks whether a magnitude of phase voltages on the powerlines matches a magnitude relationship of the phase voltages for a time frame of three sinusoidal waves separate with a 120 degrees phase difference and diagnoses that the servo motor is in the unsynchronized state when the magnitude of the phase voltages does not match the magnitude relationship of the phase voltages for the time frame of three sinusoidal waves separate with the 120 degrees phase difference.

15. The apparatus of claim 10, wherein the one or more processors are further configured to convert the confident rotor position to a position of the servo joint according to a kinematic relationship between the rotor and an output of the joint, further comprising storage, wherein the one or more processors is configured to store an initial joint position of the servo joint in a power-on status of the apparatus on the storage, and is configured to perform an initialization diagnosis procedure upon power-on or booting that compares the initial joint position with a last-stored joint position of the servo joint, the initialization diagnosis procedure comprising cutting power to the servo motor when a difference between the initial joint position and the last-stored joint position exceeds a threshold value.

16. The safety apparatus of claim 10, further comprises a power cutting member configured to cut power to the servo motor according to the signal to cut the power generated by the one or more processors.

17. The safety apparatus of claim 10, wherein the one or more processors are configured to perform a position or speed monitoring function that stops the servo joint by cutting the power to the servo motor or by sending a motion stop signal to the servo driver.

18. The safety apparatus of claim 10, further comprising additional measurement circuitry configured to detect the electric signal on the powerlines, wherein the one or more processors comprises a multi-channel structure.

19. A method of operating some or all of a robot system, the method comprising:

with a servo driver, driving a servo motor over powerlines to move two or more components of a robot about a joint, the powerlines having multiple phases;

with measurement circuitry, detecting an electric signal on the power lines;

converting the electric signal detected by the measurement circuitry into a digitized signal group;

determining whether the servo motor is in a synchronized state based on the electric signal detected by the measurement circuitry;

cutting power to the servo motor when the servo motor is determined to be in an unsynchronized state;

determining whether the digitized signal group includes a fault under an assumption that the servo driver is in the synchronized state; and cutting power to the servo motor when the digitized signal group is determined to include the fault.

20. The method of claim 19, further comprising:

generating a confident speed or position of the robot when the digitized signal group is determined not to include the fault and when the servo motor is determined to be in the synchronized state; and performing a safety position or speed monitoring function on the robot based on the confident speed or position.

* * * * *